United States Patent
Shinohara (10) Patent No.: US 6,661,583 B2
(45) Date of Patent: Dec. 9, 2003

(54) CLOSE-UP ATTACHMENT LENS

(75) Inventor: Yoshikazu Shinohara, Saitama (JP)

(73) Assignee: Fuji Photo Optical Co., Ltd., Saitama (JP)

(*) Notice: Subject to any disclaimer, the term of this patent is extended or adjusted under 35 U.S.C. 154(b) by 12 days.

(21) Appl. No.: 10/136,674

(22) Filed: May 1, 2002

(65) Prior Publication Data

US 2002/0171943 A1 Nov. 21, 2002

(30) Foreign Application Priority Data

May 7, 2001 (JP) .......................... 2001-136084

(51) Int. Cl.[7] .......................... G02B 15/02; G02B 15/14
(52) U.S. Cl. .......................... 359/673; 359/688
(58) Field of Search .................. 359/673, 688

(56) References Cited

U.S. PATENT DOCUMENTS 5,216,546 A  *  6/1993  Hasushita ................ 359/673
6,002,533 A  * 12/1999  Yoneyama ............... 359/785
6,038,082 A  *  3/2000  Takatsuki ................ 359/688

FOREIGN PATENT DOCUMENTS

JP   05-224121   9/1993
JP   09-5628    1/1997

* cited by examiner

Primary Examiner—David N. Spector
(74) Attorney, Agent, or Firm—Frommer Lawrence & Haug LLP; Matthew K. Ryan (57) ABSTRACT

Provided is a close-up attachment lens suitably applicable to a taking lens body comprising a lens group in charge of a focus function and a lens group in charge of a zoom function completely separate from each other. The attachment lens is mounted on the taking lens body on an object side for close-up shooting. The attachment lens comprises a cemented lens having a negative refractive power as a whole, the cemented lens including a first lens with a convex surface on an object side having a positive refractive power and a second lens with a convex surface on an image plane having a negative refractive power, and a third single lens having a positive refractive power. The taking lens body comprises a focus lens group, a zoom lens group and a master lens group which are disposed independently of one another. The use of the attachment lens allows close-up shooting while maintaining various aberrations in a taking lens in a favorable condition.

4 Claims, 8 Drawing Sheets

FIG. 1

| EXAMPLE 1 (f=800mm) |||||
|---|---|---|---|---|
| Si (SURFACE No.) | Ri (RADIUS OF CURVATURE) | Di (SURFACE SEPARATION) | Ndj (REFRACTIVE INDEX) | $\nu dj$ (ABBE'S No.) |
| 1 | 202.1378 | 7.98625 | 1.487476 | 70.2 |
| 2 | 1580.1710 | 2.53321 | 1.639271 | 44.9 |
| 3 | 221.4527 | 3.88887 | | |
| 4 | 828.9226 | 5.65671 | 1.487476 | 70.2 |
| 5 | −478.1690 | 6.68859 | | |

FIG. 2

SPHERICAL
ABERRATION
FIG. 3A

ASTIGMATISM
FIG. 3B

DISTORTION
FIG. 3C

SPHERICAL
ABERRATION
FIG. 4A

ASTIGMATISM
FIG. 4B

DISTORTION
FIG. 4C

Wide

FNo.
2.244
2.639
3.202
4.481

SPHERICAL
ABERRATION
FIG. 5A

ASTIGMATISM
FIG. 5B

DISTORTION
FIG. 5C

Tele

FNo.
2.507
2.948
3.578
5.005

SPHERICAL
ABERRATION
FIG. 6A

ASTIGMATISM
FIG. 6B

DISTORTION
FIG. 6C

| EXAMPLE 2 (f=600mm) | | | | |
|---|---|---|---|---|
| Si (SURFACE No.) | Ri (RADIUS OF CURVATURE) | Di (SURFACE SEPARATION) | Ndj (REFRACTIVE INDEX) | νdj (ABBE'S No.) |
| 1 | 203.4223 | 7.92002 | 1.489149 | 70.2 |
| 2 | 1252.2740 | 2.53229 | 1.642681 | 44.9 |
| 3 | 214.8960 | 3.63275 | | |
| 4 | 597.7289 | 5.99090 | 1.489149 | 70.2 |
| 5 | −377.2090 | 5.98728 | | |

FIG. 7

SPHERICAL
ABERRATION
FIG. 8A

ASTIGMATISM
FIG. 8B

DISTORTION
FIG. 8C

SPHERICAL
ABERRATION
FIG. 9A

ASTIGMATISM
FIG. 9B

DISTORTION
FIG. 9C

| EXAMPLE 3 (f=400mm) | | | | |
|---|---|---|---|---|
| Si (SURFACE No.) | Ri (RADIUS OF CURVATURE) | Di (SURFACE SEPARATION) | Ndj (REFRACTIVE INDEX) | νdj (ABBE'S No.) |
| 1 | 200.8042 | 7.31562 | 1.487476 | 70.2 |
| 2 | 786.9943 | 2.57401 | 1.639271 | 44.9 |
| 3 | 191.4927 | 3.12689 | | |
| 4 | 372.3418 | 8.39200 | 1.487476 | 0.20 |
| 5 | -256.147 | 4.69642 | | |

FIG. 10

SPHERICAL
ABERRATION

FIG. 11A

ASTIGMATISM

FIG. 11B

DISTORTION

FIG. 11C

SPHERICAL
ABERRATION

FIG. 12A

ASTIGMATISM

FIG. 12B

DISTORTION

FIG. 12C

CLOSE-UP ATTACHMENT LENS

BACKGROUND OF THE INVENTION

1. Field of the Invention

The present invention relates to a close-up attachment lens used through mounting on a taking lens with a zoom function, and more specifically a close-up attachment lens suitably used for, for example, a professional use (broadcasting) television camera.

2. Description of the Related Art

In general, zoom lenses are used for shooting cameras such as broadcasting cameras, etc. In such a zoom lens, an attachment lens is often mounted on a front or rear side of a main lens system (taking lens body) to be capable of close-up shooting. Conventionally, in most cases, such a close-up attachment lens comprises one or two single lenses. However, it is difficult for the attachment lens with such a simple configuration to satisfy optical performance requirements in a whole zoom (magnification change) range of the taking lens body on which the attachment lens is mounted.

For example, in Japanese Unexamined Patent Publication No. Hei 5-224121, a close-up attachment lens comprising two lens groups with three lenses having a positive refractive power as a whole has been proposed. The attachment lens comprises a cemented lens including a first meniscus lens with a concave surface on an object side having a positive refractive power and a second meniscus lens with a concave surface on the object side having a negative refractive power, and a third biconvex lens having a positive refractive power in order from the object side. By the use of the attachment lens, various aberrations in a whole optical system of the taking lens body and the attachment lens, specifically a change in distortion accompanied by a magnification change, axial chromatic aberration at the tele side, coma aberration, etc. are excellently compensated, so optical performance is maintained even in the case of close-up shooting at a much shorter distance, compared to a minimum shooting distance of the taking lens body.

It is assumed that the attachment lens according to the above publication is used through mounting on a taking lens body with the following configuration. That is, the attachment lens is mounted on a zoom lens comprising a first unit having a positive refractive power, a second unit having a negative refractive power, a third unit disposed in front of an aperture stop (on the object side) and having a positive refractive power and a fourth unit disposed behind the aperture stop (on the image side) and having a positive refractive power in order from the object side. The zoom lens adopts a zoom system that a magnification change from the wide end to the tele end is carried out through moving the second unit toward an image plane, and at the same time, a shift of the image plane accompanied by the magnification change is compensated through moving the fourth unit. Also, the focus of the zoom lens is adjusted through moving the fourth unit along an optical axis. That is, the zoom lens is configured so that the fourth unit is in charge of compensating a shift of the image plane and adjusting the focus. In addition, the first unit and the third unit are fixed during changing the magnification and adjusting the focus.

Except for the zoom lens with the configuration described in the above publication, there is, for example, a zoom lens for a shooting camera with a configuration disclosed in Japanese Unexamined Patent Publication No. Hei 9-5628. The zoom lens with such a configuration comprises a first unit having a focus function, a second unit having a magnification change function, and a third unit having an imaging function. If the attachment lens described in the above publication (Japanese Unexamined Patent Publication No. Hei 5-224121) is applied to the zoom lens with such a configuration, aberrations of various kinds are too large and not suitable for practical use. The reason is that the taking lens body to which the attachment lens described in the above publication (Japanese Unexamined Patent Publication No. Hei 5-224121) is applicable is a zoom lens which compensates a shift of the image plane accompanied by a magnification change and adjusts the focus through moving the fourth unit, and the zoom lens has a completely different basic configuration from the zoom lens described in Japanese Unexamined Patent Publication No. Hei 9-5628.

Thus, the attachment lens which has been conventionally proposed is applicable to the taking lens body comprising the fourth unit in charge of compensating a shift of the image plane and adjusting the focus, so it is not suitably applicable to any other taking lens bodies with different configurations.

SUMMARY OF THE INVENTION

In view of the foregoing, it is an object of the invention to provide a close-up attachment lens suitably applicable to a taking lens comprising a lens group in charge of a focus function and a lens group in charge of a magnification change function completely separate from each other.

In a close-up attachment lens according to the invention used through mounting on a taking lens body on an object side, the taking lens body including successively from an object side: a first lens group having a focus function and a positive refractive power, a second lens group having a magnification change function and a negative refractive power, a third lens group having a function of compensating a shift of an image plane accompanied by a magnification change and a negative refractive power, and a fourth lens group having an imaging function and a positive refractive power, the close-up attachment lens comprises successively from the object side: a cemented lens having a negative refractive power as a whole, the cemented lens including a first lens with a convex surface on the object side having a positive refractive power and a second lens with a concave surface on an image side having a negative refractive power; and a third single lens having a positive refractive power. Hereinafter in the description, "close-up shooting" means shooting a subject in a close range in which the taking lens body cannot cover.

When the close-up attachment lens according to the invention is mounted on the taking lens body including the first lens group for focusing, the second lens group for changing a magnification, the third lens group for compensating a shift of an image plane and the fourth lens group for forming an image, preferable performance can be delivered. The close-up attachment lens functions as a lens with a configuration having two lens groups with three lenses comprising the cemented lens having a negative refractive power and the third lens having a positive refractive power. The cemented lens includes the first lens with a convex surface on the object side having a positive refractive power and the second lens with a concave surface on the image side having a negative refractive power. The close-up attachment lens is mounted to be capable of shooting a subject in a close range in which the taking lens body cannot cover while maintaining practical optical performance.

In the close-up attachment lens according to the invention, it is more preferable that the focal length f12 of the cemented lens and the focal length f3 of the third lens satisfy a conditional expression −6<f12/f3<−4. In this case, specifically spherical aberration is optimized.

In the close-up attachment lens according to the invention, it is more preferable that the Abbe number vd1 of the first lens and the Abbe number vd2 of the second lens satisfy conditional expressions: vd1>60.0 and vd2<50.0. In this case, specifically lateral chromatic aberration is optimized.

DETAILED DESCRIPTION OF THE PREFERRED EMBODIMENTS

A preferred embodiment of the present invention is described in more detail below referring to the accompanying drawings.

Figure 1:
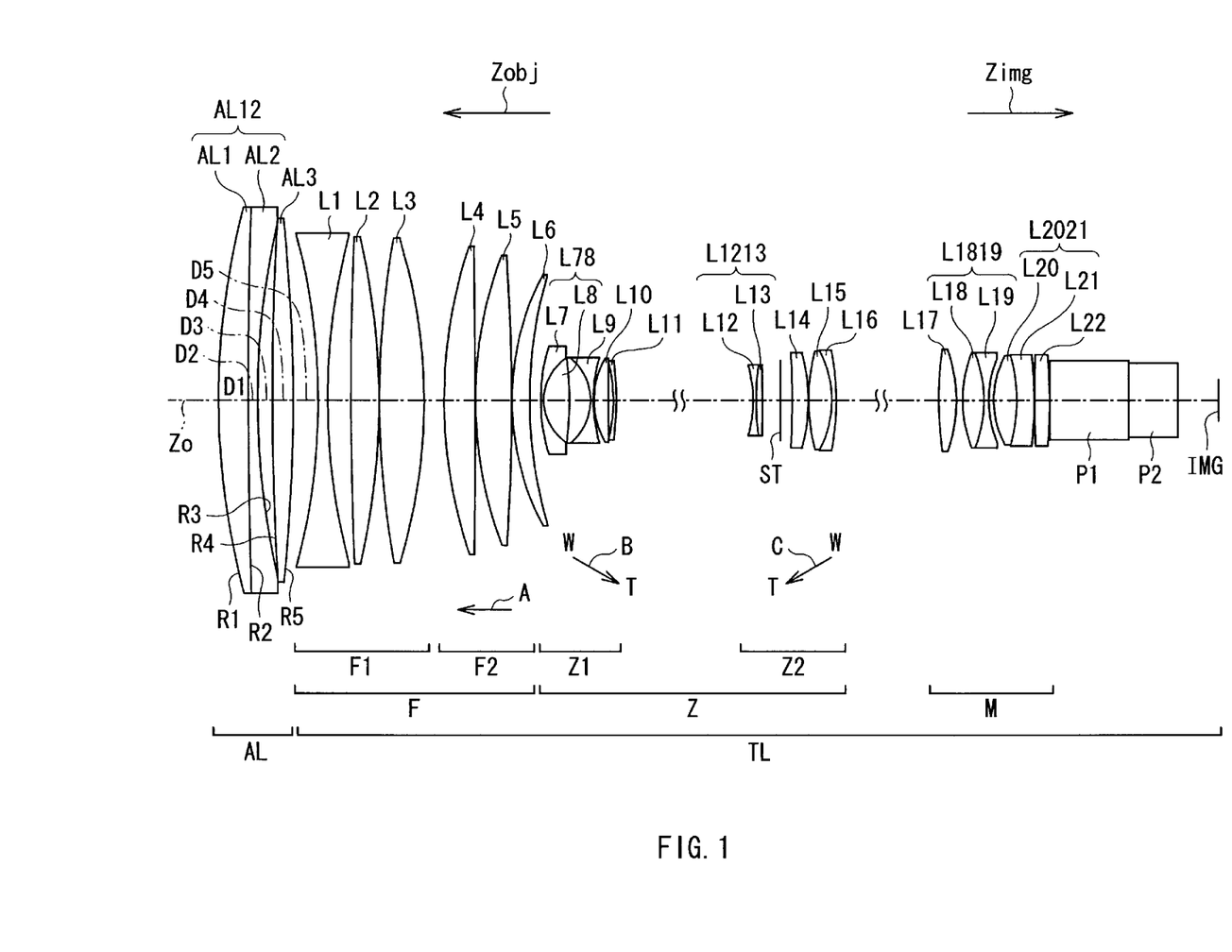
FIG. 1 is a cross-sectional view showing a general configuration of a taking lens body in a state that a close-up attachment lens according to an embodiment of the invention is mounted thereon.

FIG. 1 shows a general configuration of a taking lens in a state that a close-up attachment lens according to an embodiment of the invention is mounted. In the drawing, the side indicated with a symbol Zobj is an object side, that is, a side where, for example, a subject to be shot exists. Further, the side indicated with a symbol Zimg is an imaging side (an image plane side), that is, a side where an image by the taking lens is formed. A symbol IMG represents an imaging plane. Assuming a lens surface closest to the object side is a first surface, a symbol Ri represents the radius of curvature of the ith ("i" is a natural number) lens surface. The number "i" is successively increased as being close to the image plane side. A symbol Di represents a surface separation on an optical axis between the ith lens surface and the i+1th surface. Incidentally, in FIG. 1, the symbol Ri and the surface separation Di are shown only in the close-up attachment lens, and not shown in a taking lens body.

The taking lens shown in FIG. 1 comprises a taking lens body TL, a close-up attachment lens AL disposed in front of the taking lens body TL (on the object side) (hereinafter simply referred to as attachment lens).

Firstly, the configuration of the attachment lens AL is described below.

The attachment lens AL comprises a cemented lens AL12 having a negative refractive power as a whole including a first lens AL1 with a convex surface on the object side having a positive refractive power, a second lens AL2 with a concave surface on an image side having a negative refractive power, and a third single lens AL3 having a positive refractive power in order from the object side along an optical axis Zo. Herein, these lenses AL1 to AL3 correspond to specific examples of "a first lens" to "a third lens", respectively, in the invention, and the shapes thereof is one of the characteristics of the invention.

The cemented lens AL12 and the third lens AL3 in the attachment lens AL are configured so as to satisfy a following conditional expression (1):

$$-6 < f12/f3 < -4 \quad (1)$$

where f12 represents the focal length of the cemented lens AL12, and the f3 represents the focal length of the third lens AL3.

Moreover, the first lens AL1 and the second lens AL2 forming the cemented lens AL12 are configured so as to satisfy following conditional expressions (2) and (3):

$$vvd1 > 60.0 \quad (2)$$

$$vvd2 < 50.0 \quad (3)$$

where vd1 represents the Abbe number of the first lens AL1, and the vd2 represents the Abbe number of the second lens AL2.

Next, the configuration of the taking lens body TL is described below.

The taking lens body TL comprises a focus lens group F having a focus function and a positive refractive power, a zoom lens group Z having a magnification change function and a negative refractive power, a master lens group M having an imaging function and a positive refractive power, and prisms P1 and P2 for color separation in order from the object side along an optical axis Zo.

The focus lens group F includes a front-side lens group F1, a rear-side lens group F2 in order from the object side. The front-side lens group F1 is a fixed unit having lenses L1, L2 and L3 in order from the object side. The rear-side lens group F2 is a movable unit having lenses L4, L5 and L6 in order from the object side. The rear-side lens group F2 is movable in a back-and-forth direction (in a lateral direction in the drawing) along the optical axis Zo independently of a magnification change operation (zooming), and is mainly used for adjusting the focus (focusing) in the case where a subject in a limited range is shot.

The zoom lens group Z includes a front-side lens group Z1 having a magnification change function and a negative refractive power and a rear-side lens group Z2 having a function of compensating a shift of an image plane accompanied by a magnification change and a negative refractive power. The front-side lens group Z1 is movable in a back-and-forth direction (in a lateral direction in the drawing)

along an optical axis to function as a variator for changing the magnification. The rear-side lens group Z2 is movable in a back-and-forth direction along the optical axis in synchronization with the move of the front-side lens group Z1 to function as a compensator for compensating the change in the image plane with the magnification change.

The front-side lens group Z1 in the zoom lens group Z includes a cemented lens L78 having lenses L7 and L8, and lenses L9, L10 and L11 in order from the object side.

The rear-side lens group Z2 in the zoom lens group Z includes a cemented lens L1213 having lenses L12 and L13, lenses L14, L15 and L16 in order from the object side. A stop ST is disposed between the lenses L13 and L14.

The master lens group M includes a biconvex lens L17, a cemented lens L1819 having a biconvex lens L18 and a biconcave lens L19, a cemented lens L2021 having a biconvex lens L20 and a meniscus lens L21 with a concave surface on the object side having a negative refractive power, and a biconvex lens L22 which are fixedly disposed in order from the object side along the optical axis Zo.

The prisms P1 and P2 are disposed between the master lens group M and the imaging surface IMG to split white light emitted from the master lens group M into, for example, three colors of R (red), G (green) and B (blue).

Next, the optical actions and effects of the taking lens with the above configuration are described below.

In the taking lens, when the front-side lens group Z1 in the zoom lens group Z moves, the focal length of the taking lens changes, and thereby the imaging magnification changes. More specifically, as indicated with an arrow B, when the front-side lens group Z1 moves to the image plane side along the optical axis, the whole imaging magnification changes from the wide end to the tele end. On the other hand, when the magnification changes from the wide end to the tele end, the rear-side lens group Z2 in the zoom lens group Z moves toward the object side along the optical axis in synchronization with the front-side lens group Z1 as indicated with an arrow C to compensate the move of the image plane accompanied by a change in the imaging magnification. Incidentally, a so-called floating system which variously changes the moving distance at the time of the magnification change is preferably used for the moving systems of the front-side lens group Z1 and the rear-side lens group Z2.

In the taking lens, in each imaging magnification (focal length) position, the rear-side lens group F2 in the focus lens group F is moved toward a direction of the optical axis Zo (an arrow A) to carry out focus adjustment (focusing). The front-side lens group F1 is placed in a fixed position.

In the taking lens, by the action of the attachment lens AL, the focal length of the whole lens system becomes shorter than that of the taking lens body TL. As a result, the whole lens system can focus on a subject in a close range which does not allow the taking lens body TL to focus thereon, so an image is formed on the imaging surface IMG.

In the embodiment, as described above, the cemented lens AL12 in the attachment lens AL includes the first lens AL1 with the convex surface on the object side having a positive refractive power and the second lens AL2 with the concave surface on the image side having a negative refractive power, thereby the cemented lens AL 12 has a negative refractive power as a whole. As a result, mounting the attachment lens AL on the taking lens body TL having a part in charge of a focus function (the focus lens group F) and a part in charge of a magnification change function (the zoom lens group Z) which are completely separate from each other allows close-up shooting while maintaining various aberrations in the whole lens system in a favorable condition.

The conditional expression (1) represents the condition of the power allocation between the cemented lens AL12 and the third lens AL3 in the attachment lens AL. When the upper limit of the conditional expression (1) is exceeded, the power of the third lens AL3 is too strong, thereby the spherical aberration at the tele side becomes too large. When the lower limit of the conditional expression (1) is exceeded, the power of the third lens AL3 becomes too week, thereby the spherical aberration at the tele side becomes too small.

By the conditional expressions (2) and (3), kinds of glass materials used for the first lens AL1 and the second lens AL2 forming the cemented lens AL12 are limited. Through satisfying the conditions, the chromatic aberration in the taking lens becomes better. When the range of the conditional expressions (1) and (2) are exceeded, the lateral chromatic aberration becomes worse as the lenses move.

As described above, mounting the attachment lens AL of the embodiment on the taking lens body TL having parts in charge of a focus function and in charge of a magnification change function independently of each other allows close-up shooting while maintaining various aberrations in the whole lens system in a favorable condition. More specifically, when the three lenses AL1 to AL3 forming the attachment lens AL satisfy the conditional expressions (1) to (3), the spherical aberration and the lateral chromatic aberration can be favorably controlled.

EXAMPLE

Next, specific numerical examples of the taking lens according to the embodiment are described below.

Example 1

The cross-sectional configuration and the zoom system of an attachment lens and a taking lens body according to an example are the same as those shown in FIG. 1.

Figure 2:
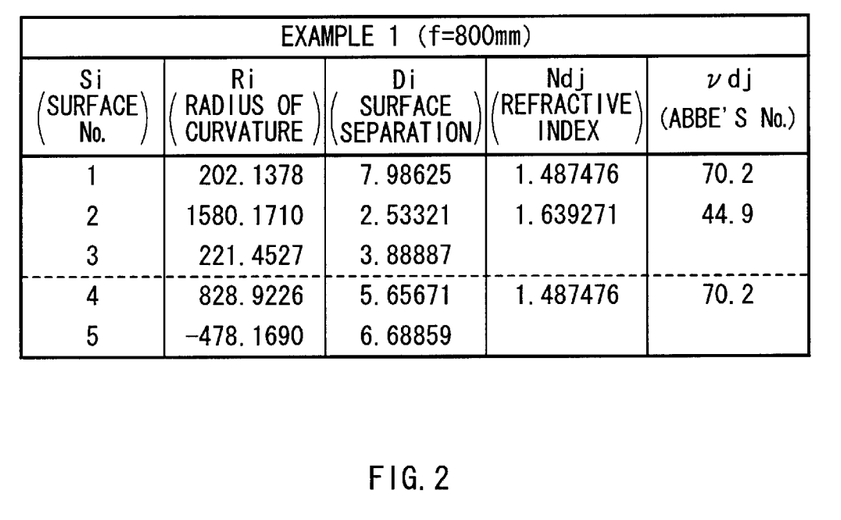
FIG. 2 is a table showing lens parameters in a first example of the close-up attachment lens shown in FIG. 1.

FIG. 2 shows a specific numerical data table regarding the configuration of the attachment lens AL of the example. In the table, the column of surface number Si shows the number of lens surface increasing as the lens surface is closer to the image plane side, assuming a lens surface closest to the object side is the first lens surface. The column of radius of curvature Ri corresponds to the symbol Ri shown in FIG. 1, and the column shows the radius of curvature of the ith lens surface from the object side. The column of surface separation Di also corresponds to the symbol Di shown in FIG. 1, and the column shows the surface separation in a direction of the optical axis between the ith lens surface Si from the object side and the i+1th lens surface Si+1. The radius of curvature Ri and the surface separation Di are expressed in millimeter (mm). The columns of Nj and vj show the refractive index and Abbe number at d-line (wavelength $\lambda d=587.6$ nm) of the jth (j=1 to 3) lens element from the object side. Further, the attachment lens AL of the example has a focal length of 800 mm.

In the example, a focal length f12 of the cemented lens AL12 is "−2977 mm", a focal length f3 of the third lens AL3 is "621 mm", so they satisfy the conditional expression (1). Further, the Abbe numbers vd1 and vd2 of the first lens AL1 and the second lens AL2 forming the cemented lens AL12 are "70.2" and "44.9", respectively, so they are within a range of the conditional expressions (2) and (3).

FIGS. 3A to 3C and FIGS. 4A to 4C show various aberrations at the wide end and at the tele end, respectively, in a state that the attachment lens AL of the example is mounted on the taking lens body TL (that is, the taking lens). In this case, the overall focal length f at the wide end is 9.0 mm, and the overall lateral magnification β at an object distance of 800 mm is 0.013. Further, the overall focal length f at the tele end is 640 mm, and the overall lateral magnification β at this time is 0.254. In addition, "overall" herein means the whole lens system including the taking lens body TL and the attachment lens AL.

Figure 3A:
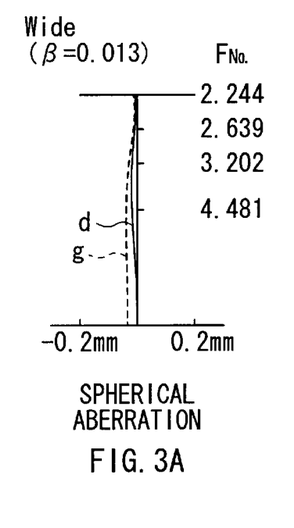
FIGS. 3A to 3C are aberration graphs of spherical aberration, astigmatism and distortion at the wide end in the close-up attachment lens of the first example.
Figure 3B:
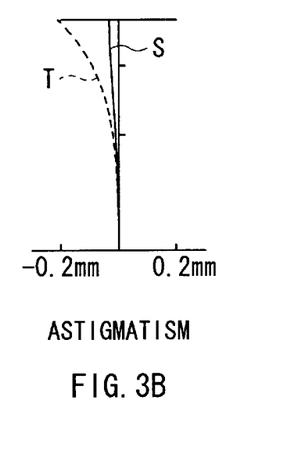
Figure 3C:
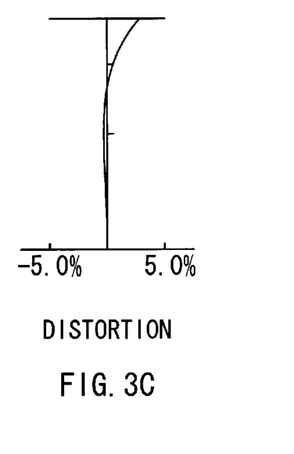
Figure 4A:
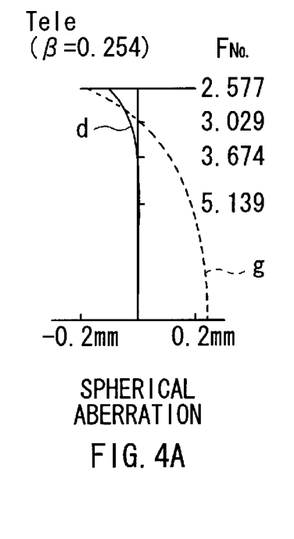
FIGS. 4A to 4C are aberration graphs of spherical aberration, astigmatism and distortion at the tele end in the close-up attachment of the first example.
Figure 4B:
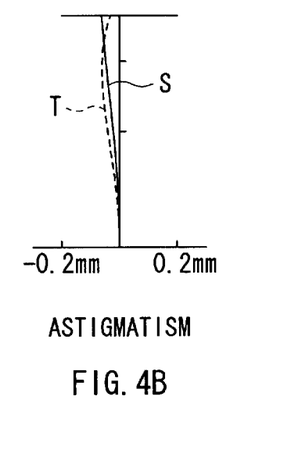
Figure 4C:
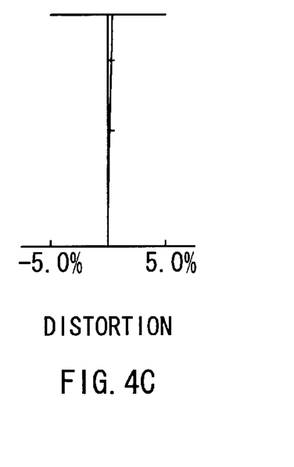
Figure 5A:
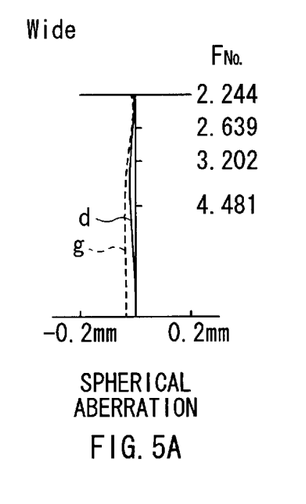
FIGS. 5A to 5C are aberration graphs of spherical aberration, astigmatism and distortion at the wide end in the taking lens body shown in FIG. 1.
Figure 5B:
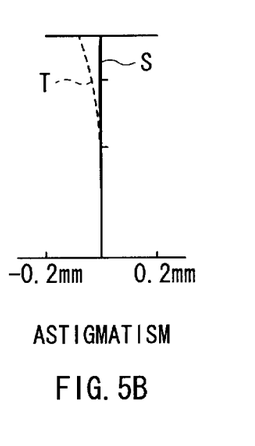
Figure 5C:
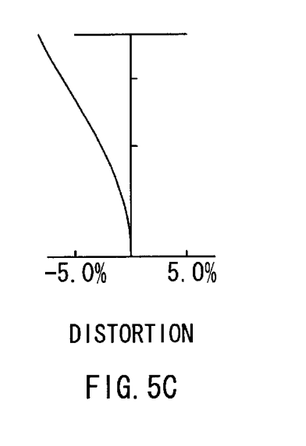
Figure 6A:
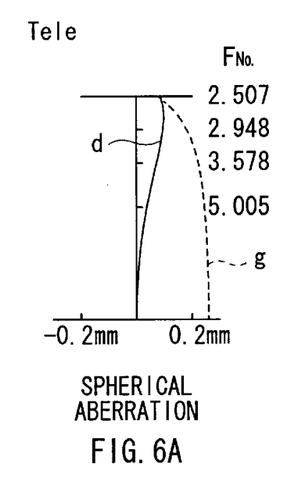
FIGS. 6A to 6C are aberration graphs of spherical aberration, astigmatism and distortion at the tele end in the taking lens body shown in FIG. 1.
Figure 6B:
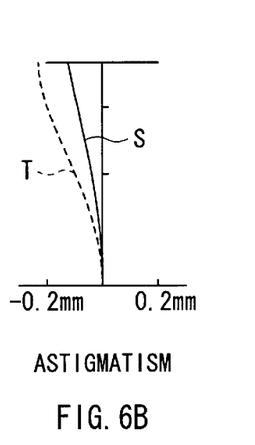
Figure 6C:
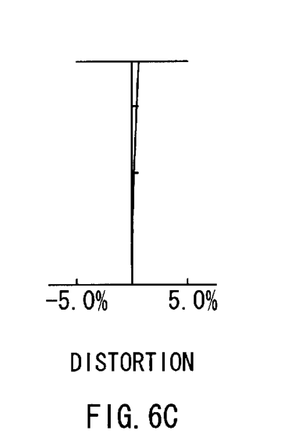

Among the drawings, FIGS. 3A and 4A show spherical aberration, FIGS. 3B and 4B show astigmatism, and FIGS. 3C and 4C show distortion. In FIGS. 3A and 4A, curved lines g and d indicates the spherical aberration at g-line (wavelength 435.8 nm) and at d-line, respectively, and FNO. indicates F number. Further, in FIGS. 3B and 4B, a solid line S indicates aberration in a sagittal image plane, and a broken line T indicates aberration in a tangential (merigional) image plane.

FIGS. 5A to 5C and FIGS. 6A to 6C show various aberrations at the wide end and at the tele end in a state that the attachment lens AL is not mounted, that is, in only the taking lens body TL. FIGS. 5A, 6A, 5B, 6B, 5C and 6C show the same as those in FIGS. 3A, 4A, 3B, 4B, 3C and 4C, respectively, and the symbols in FIGS. 5A, 6A, 5B, 5C and 6C indicate the same as those in FIGS. 3A, 4A, 3B, 4B, 3C and 4C. The focal length f of the taking lens body TL at the wide end is 8.1 mm, and the focal length f thereof at the tele end is 159 mm.

As shown in FIGS. 3A to 3C, FIGS. 4A to 4C, FIGS. 5A to 5C, and FIGS. 6A to 6C, in the example, the fact that various aberrations at both ends of a zoom range in a state that the attachment lens AL is mounted become much worse, compared with those in the taking lens body TL only (refer to FIGS. 5A to 5C and FIGS. 6A and 6C) is not acknowledged, and the aberrations are kept within a range acceptable for practical use.

Example 2

The cross-sectional configuration and zoom system of the attachment lens and the taking lens body according to another example are the same as those shown in FIG. 1.

Figure 7:
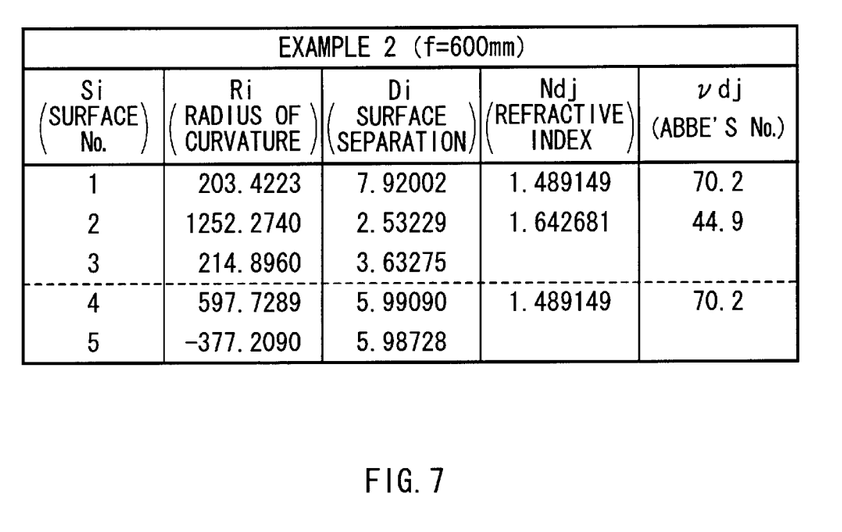
FIG. 7 is a table showing lens parameters in a second example of the close-up attachment lens shown in FIG. 1.
Figure 8A:
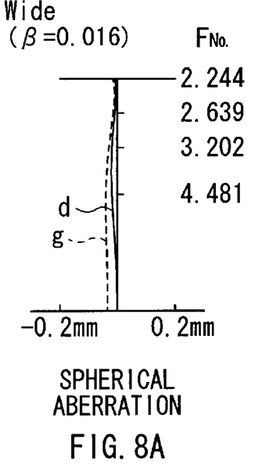
FIGS. 8A to 8C are aberration graphs of spherical aberration, astigmatism and distortion at the wide end in the close-up attachment lens of the second example.
Figure 8B:
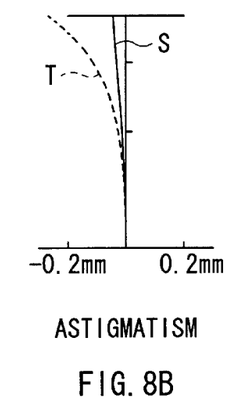
Figure 8C:
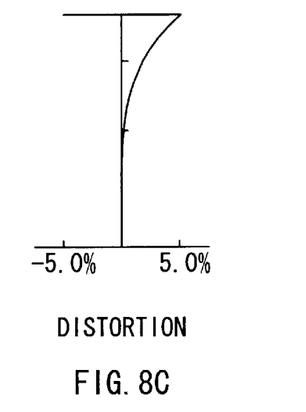
Figure 9A:
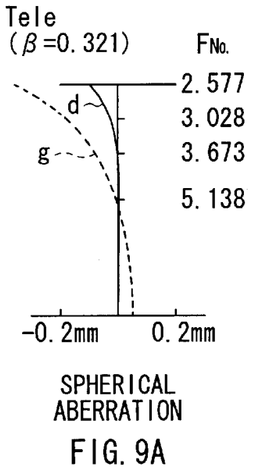
FIGS. 9A to 9C are aberration graphs of spherical aberration, astigmatism and distortion at the tele end in the close-up attachment lens of the second example.
Figure 9B:
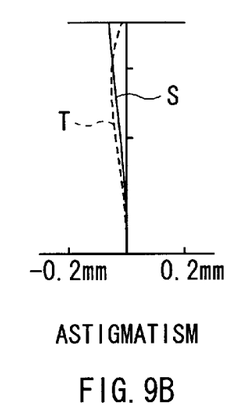
Figure 9C:
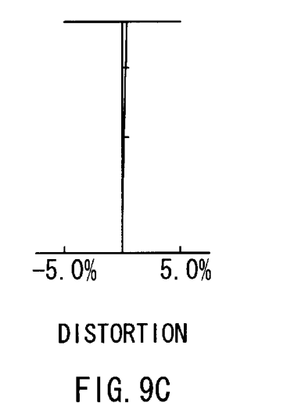

FIG. 7 shows specific numerical data regarding the configuration of the attachment lens AL of the example. The attachment lens AL of the example has a focal length of 600 mm.

In the example, a focal length f12 of the cemented lens AL12 is "−2400 mm", a focal length f3 of the third lens AL3 is "473 mm", so they satisfy the conditional expression (1). Further, like Example 1, the Abbe numbers vd1 and vd2 of the first lens AL1 and the second lens AL2 forming the cemented lens AL12 are "70.2" and "44.9", respectively, so they are within a range of the conditional expressions (2) and (3).

FIGS. 8A to 8C and FIGS. 9A and 9C show various aberrations at the wide end and at the tele end, respectively, in a state that the attachment lens AL of the example is mounted on the taking lens body TL. In the example, the overall focal length f at the wide end is 9.2 mm, and the overall lateral magnification β at an object distance of 600 mm is 0.014. Further, the overall focal length f at the tele end is 48268 mm, and the overall lateral magnification β at this time is 0.265. FIGS. 8A, 9A, 8B, 9B, 8C and 9C show the same as those in FIGS. 3A, 4A, 3B, 4B, 3C and 4C, respectively, and the symbols in FIGS. 8A, 9A, 8B, 9B, 8C and 9C indicate the same as those in FIGS. 3A, 4A, 3B, 4B, 3C and 4C.

As shown in FIGS. 8A to 8C, FIGS. 9A to 9C, FIGS. 5A to 5C and FIGS. 6A to 6C, in the example, the fact that various aberrations at both ends of a zoom range in a state that the attachment lens AL is mounted become much worse, compared with those in the taking lens body TL only (refer to FIGS. 5A to 5C and FIGS. 6A and 6C) is not acknowledged, and the aberrations are kept within a range acceptable for practical use.

Example 3

The cross-sectional configuration and zoom system of the attachment lens and the taking lens body according to a still another example are the same as those shown in FIG. 1.

Figure 10:
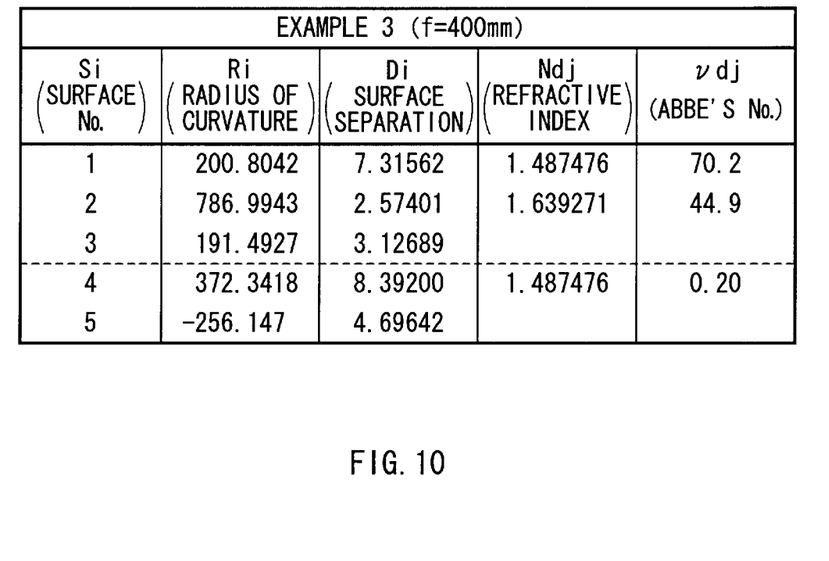
FIG. 10 is a table showing lens parameters in a third example of the close-up attachment lens shown in FIG. 1.
Figures 11A, 11B:
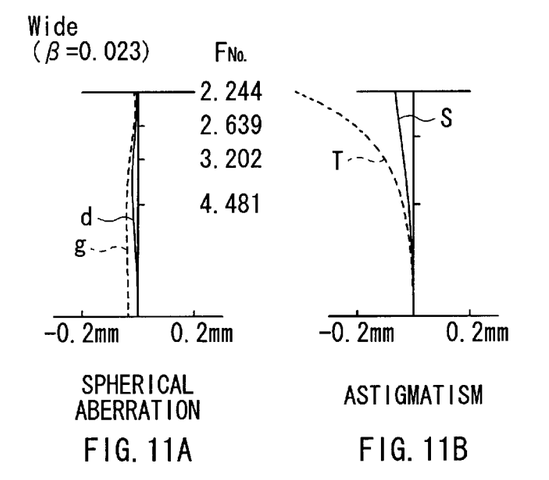
FIGS. 11A to 11C are aberration graphs of spherical aberration, astigmatism and distortion at the wide end in the close-up attachment lens of the third example.
Figure 11C:
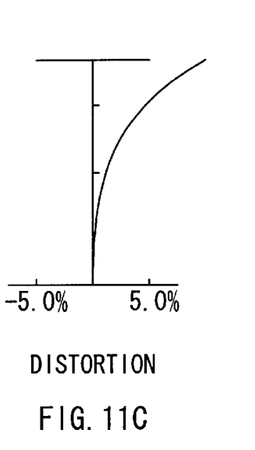
Figure 12A:
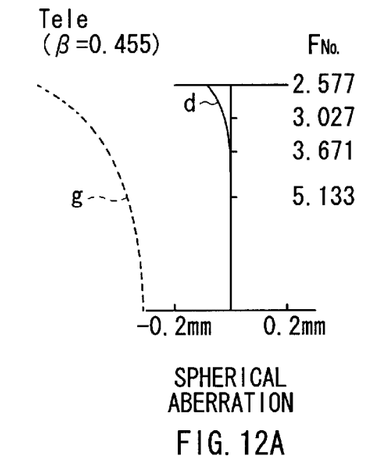
FIGS. 12A to 12C are aberration graphs of spherical aberration, astigmatism and distortion at the tele end in the close-up attachment lens of the third example.
Figure 12B:
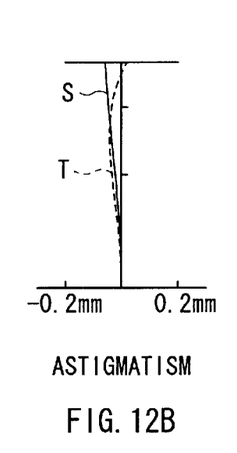
Figure 12C:
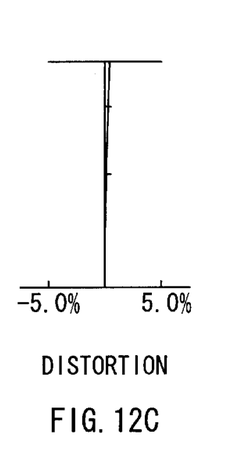

FIG. 10 shows specific numerical data regarding the configuration of the attachment lens AL of the example. The attachment lens AL of the example has a focal length of 400 mm.

In the example, a focal length f12 of the cemented lens AL12 is "−1484 mm", a focal length f3 of the third lens AL3 is "311 mm", so they satisfy the conditional expression (1). Further, like Example 1, the Abbe numbers vd1 and vd2 of the first lens AL1 and the second lens AL2 forming the cemented lens AL12 are "70.2" and "44.9", respectively, so they are within a range of the conditional expressions (2) and (3).

FIGS. 11A to 11C and FIGS. 12A to 12C show various aberrations at the wide end and at the tele end, respectively, in a state that the attachment lens AL of the example is mounted on the taking lens body TL. In the example, the overall focal length f at the wide end is 9.8 mm, and the overall lateral magnification β at this time is −0.02. Further, the overall focal length f at the tele end is −328 mm, and the overall lateral magnification β at this time is 0.397. FIGS. 11A, 12A, 11B, 12B, 11C and 12C show the same as those in FIGS. 3A, 4A, 3B, 4B, 3C and 4C, respectively, and the symbols in FIGS. 11A, 12A, 11B, 12B, 11C and 12C indicate the same as those in FIGS. 3A, 4A, 3B, 4B, 3C and 4C.

As shown in FIGS. 11A to 11C, FIGS. 12A to 12C, FIGS. 5A to 5C and FIGS. 6A to 6C, in the example, the fact that various aberrations at both ends of a zoom range in a state that the attachment lens AL is mounted become much worse, compared with those in the taking lens body TL only (refer to FIGS. 5A to 5C and FIGS. 6A and 6C) is not acknowledged, and the aberrations are kept within a range acceptable for practical use.

Although the present invention is described referring to the embodiment and some examples, the invention is not limited to them, but is applicable to various modifications. For example, the radius of curvature Ri, the surface separation Di, the refractive index Nj and the Abbe number vj of each lens element are not limited to the values shown in the above numerical examples, and other values may be applicable. Moreover, the number of lenses forming each lens group in the taking lens body TL is not limited to that shown in FIG. 1, and any other number may be applicable.

Further, the invention is widely applicable to a lens not only for a television camera but also for any other shooting equipment such as a still camera having a zoom function.

As described above, since the close-up attachment lens according to an aspect of the invention comprises the cemented lens having a negative refractive power as a whole including the first lens with a convex surface on the object side having a positive refractive power and the second lens with a concave surface on the image side having a negative refractive power, and the third lens having a positive refrac tive power, when the attachment lens is mounted on the taking lens body comprising the first lens group for focusing, the second lens group for magnification change, the third lens group for compensating a shift of the image plane and the fourth lens group for imaging, suitable performance can be delivered. That is, while maintaining practical optical performance, a subject in a close range in which the taking lens body with the above configuration cannot cover can be shot.

Specifically, according to the close-up attachment lens of another aspect of the invention, the focal length f12 of the cemented lens and the focal length f3 of the third lens satisfy a conditional expression −6<f12/f3<−4, so specifically an increase in spherical aberration can be effectively prevented.

More speifically, according to the close-up attachment lens of a still another aspect of the invention, the Abbe number vd1 of the first lens and the Abbe number vd2 of the second lens satisfy conditional expressions vd>60.0 and vd2>50.0, respectively, so specifically an increase in lateral chromatic aberration can be effectively prevented.

What is claimed is:

1. A close-up attachment lens used through mounting on a taking lens body on an object side, the taking lens including successively from an object side a first lens group having a focus function and a positive refractive power, a second lens group having a magnification change function and a negative refractive power, a third lens group having a function of compensating a shift of an image plane accompanied by a magnification change and a negative refractive power, and a fourth lens group having an imaging function and a positive refractive power, the close-up attachment lens comprising successively from the object side:

a cemented lens having a negative refractive power as a whole, the cement lens including a first lens with a convex surface on the object side having a positive refractive power and a second lens with a concave surface on an image side having a negative refractive power; and a third single lens having a positive refractive power.

2. A close-up attachment lens according to claim 1, wherein the close-up attachment lens satisfies a following expression (1):

$$-6<f12/f3<-4 \tag{1}$$

where f12 represents a focal length of the cemented lens, and f3 represents a focal length of the third lens.

3. A close-up attachment lens according claim 1, wherein the close-up attachment lens satisfies following expressions (2) and (3):

$$vd1>60.0 \tag{2}$$

$$vd2<50.0 \tag{3}$$

where vd1 represents an Abbe number of the first lens, and vd2 represents an Abbe number of the second lens.

4. A close-up attachment lens according to claim 2, wherein the close-up attachment lens satisfies the following expressions (2) and (3):

$$vd1>60.0 \tag{2}$$

$$vd2<50.0 \tag{3}$$

where vd1 represents an Abbe number of the first lens, and vd2 represents an Abbe number of the second lens.

* * * * *